United States Patent [19]
Bellinger

[11] Patent Number: 5,921,883
[45] Date of Patent: Jul. 13, 1999

[54] SYSTEM FOR MANAGING ENGINE RETARDING TORQUE DURING COAST MODE OPERATION

[75] Inventor: Steven M. Bellinger, Columbus, Ind.

[73] Assignee: Cummins Engine Company, Inc., Columbus, Ind.

[21] Appl. No.: 09/080,753

[22] Filed: May 18, 1998

Related U.S. Application Data

[51] Int. Cl.$^6$ ........................................... F16H 61/00
[52] U.S. Cl. ....................... 477/33; 477/108; 477/121; 477/118; 123/322
[58] Field of Search ................... 477/118, 107, 477/108, 73, 91, 121, 32, 33; 123/322, 321; 701/54, 58, 102, 103

[56] References Cited

U.S. PATENT DOCUMENTS

| | | | |
|---|---|---|---|
| 4,933,850 | 6/1990 | Wheeler | 477/92 X |
| 5,081,887 | 1/1992 | Kato | 477/33 |
| 5,109,826 | 5/1992 | Kato | 477/33 X |
| 5,121,723 | 6/1992 | Stepper et al. | 123/322 |
| 5,393,276 | 2/1995 | White et al. | 477/107 X |
| 5,393,277 | 2/1995 | White et al. | 477/108 |
| 5,401,223 | 3/1995 | White et al. | 477/108 |
| 5,409,432 | 4/1995 | Steeby | 477/91 X |
| 5,609,548 | 3/1997 | White et al. | 477/124 |
| 5,655,407 | 8/1997 | Dresden, III et al. | 74/366 R |
| 5,842,376 | 12/1998 | Dresden, III et al. | 477/124 X |

*Primary Examiner*—Dirk Wright
*Assistant Examiner*—Peter T. Kwon
*Attorney, Agent, or Firm*—Beck, Michael & Beck, P.C.

[57] ABSTRACT

A system for managing engine retarding torque during coast mode operation includes a control computer operable in one embodiment to control boost pressure, engine compression brake setting and/or engine accessory deactivation upon detection of coast mode operation with the engine compression brakes enabled. In another embodiment, the control computer is operable to determine a current engine retarding torque value, based either on an estimation thereof as a function of current boost pressure and engine compression brake setting or based on a mass estimation technique accounting for the grade of the road, and control boost pressure, engine compression brake operation and/or engine accessory deactivation to thereby control engine retarding torque upon detection of coast mode operation with the engine brakes enabled. In either case, the control system is operable to manage engine retarding torque so as not to exceed the coast mode torque capacities of any of the drivetrain components, and of the axle assembly in particular.

12 Claims, 6 Drawing Sheets

5,921,883

SYSTEM FOR MANAGING ENGINE RETARDING TORQUE DURING COAST MODE OPERATION

FIELD OF THE INVENTION

The present invention relates generally to systems for controlling the operation of an internal combustion engine, and more specifically to systems for controlling engine resistance torque.

BACKGROUND OF THE INVENTION

Systems for controlling the output torque of an internal combustion engine are generally known and extensively used, particularly in the diesel engine industry. One example of such a control system is set forth in U.S. Pat. No. 5,703,325 to Bellinger, which is assigned to the assignee of the present invention, and which is concerned with protecting drivetrain components by limiting engine output torque so as not to exceed the input torque capacities of the various drivetrain components. However, while the concepts disclosed in the Bellinger patent are useful in protecting drivetrain components during so-called positive engine output torque conditions (i.e. positive engine fueling conditions), they do not address protecting such drivetrain components during coast mode operation (i.e. zero engine fueling conditions) when the engine retarding torque, due to engine compression brake operation, may exceed the torque capacities of such components.

One particular concern during coast mode operation is the torque capacity of the vehicle axle. An example of a known axle 10 is illustrated in FIGS. 1 and 2, wherein the axle 10 includes a so-called universal joint 14 connected to a shaft 16 of a pinion gear 18. Pinion gear 18 is adapted to mesh with a ring gear 20, wherein the ring gear 20 is connected to axle shafts 22a and 22b which are, in turn, coupled to wheels 12a and 12b respectively. Under positive engine output torque (drive mode) operation, a propeller shaft (not shown) extending from a transmission or other drivetrain component drives the universal joint 14 which causes the pinion gear to rotate in the direction shown by arrow 32 in FIG. 2. The teeth 28 and grooves 30 therebetween of gear 18 mesh with corresponding teeth 24 and grooves 26 therebetween of gear 20 so that pinion gear 18 is operable to drive ring gear 20 in the direction shown by arrow 34 of FIG. 2. Ring gear 20 is coupled to axle shafts 22a and 22b, and thereby drives wheels 12a and 12b via shafts 22a and 22b under positive engine output torque (drive mode) operation. During coast mode operation, the wheels 12a and 12b drive axle shafts 22a and 22b respectively, thereby driving ring gear 20. The ring gear 20, in turn, drives the pinion gear 18 which, in turn, drives the universal joint 14 against the engine retarding torque provided by engine compression brake operation during zero fueling (coast down). The engine retarding torque seen by the axle 10 is the actual engine retarding torque multiplied by the currently engaged gear ratio of the transmission (not shown).

The teeth 28 and grooves 30 of pinion gear 18, and the teeth 24 and grooves 26 of ring gear 20, are typically designed for optimum performance and durability under drive mode operation (positive engine torque). Therefor, by design, the input torque capacity of axle 10 typically greater in drive mode operation than in coast mode operation. As a result, while axle 10 may have sufficient input torque capacity to withstand the maximum output torque of the engine, it may not have sufficient torque capacity to withstand maximum engine retarding torque levels. Under such conditions, damage to the teeth 28 of pinion gear 18 and/or teeth 24 of ring gear 20 results, thereby compromising the reliability and durability thereof.

What is therefore needed is a system for controlling engine retarding torque during coast mode operation so that the engine retarding torque levels do not exceed the coast mode torque capacities of the various drivetrain components in general, and of the one or more vehicle axles in particular.

SUMMARY OF THE INVENTION

The foregoing shortcomings of the prior art are addressed by the present invention. In accordance with one aspect of the present invention, a method of controlling retarding torque of an internal combustion engine equipped with engine compression brakes and carried by a vehicle, comprises the steps of determining whether the vehicle is undergoing coast mode operation, determining whether engine compression brake operation is enabled, determining one of a currently engaged gear ratio and vehicle speed, determining a coast mode torque capacity of a drivetrain component carried by the vehicle, and controlling retarding torque of the engine as a function of either the currently engaged gear ratio or the vehicle speed, only if the vehicle is undergoing coast mode operation and engine compression brake operation is enabled, thereby maintaining the retarding torque of the engine below the coast mode torque capacity of the drive axle.

One object of the present invention is to provide a system for managing the retarding torque of an internal combustion engine during coast mode operation to thereby maintain the retarding torque below coast mode torque capacities of the various drivetrain components in general, and of the vehicle drive axle in particular.

Another object of the present invention is to provide such a system operable to manage engine retarding torque via control of any combination of controlling boost pressure, controlling engine compression brake settings and control of engine accessory operation.

These and other objects of the present invention will become more apparent from the following description of the preferred embodiments.

DESCRIPTION OF THE PREFERRED EMBODIMENTS

Figure 1:
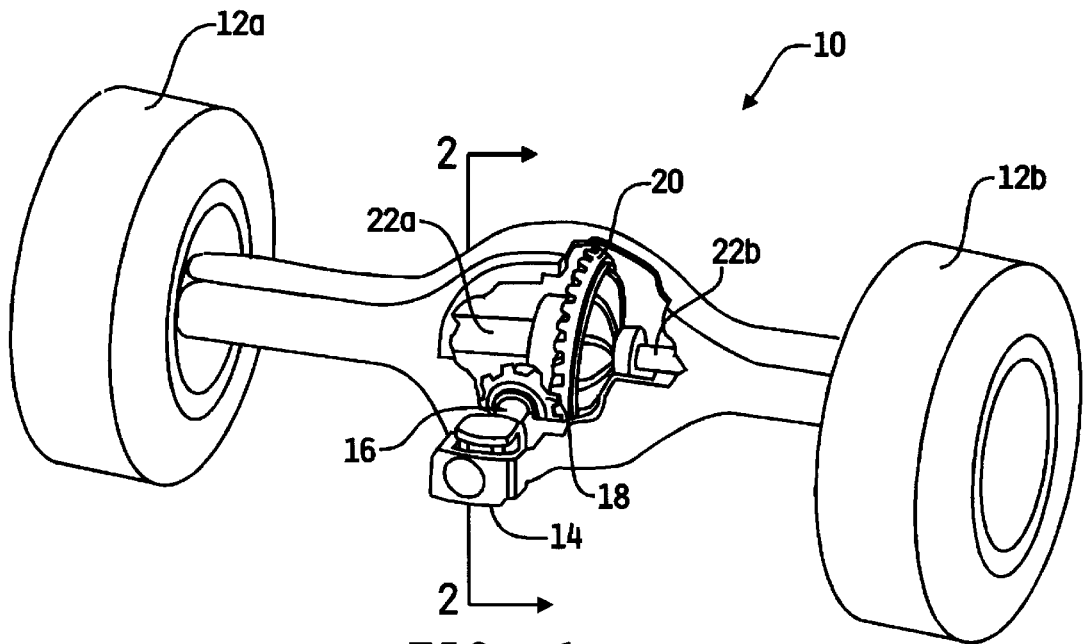
FIG. 1 is a perspective view of a known axle assembly illustrating the interaction between the pinion and ring gears thereof.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
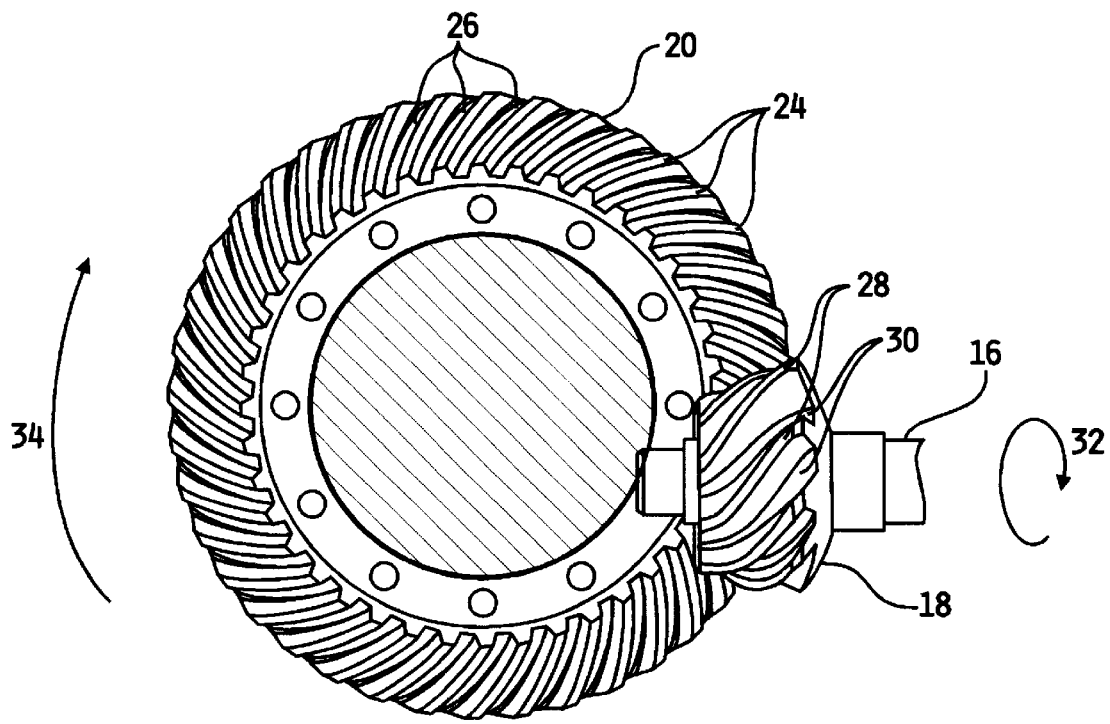
FIG. 2 is a partial cross-sectional view of the axle assembly of FIG. 2, taken along section lines 2—2, illustrating the interaction between the pinion and ring gears thereof.
Figure 3:
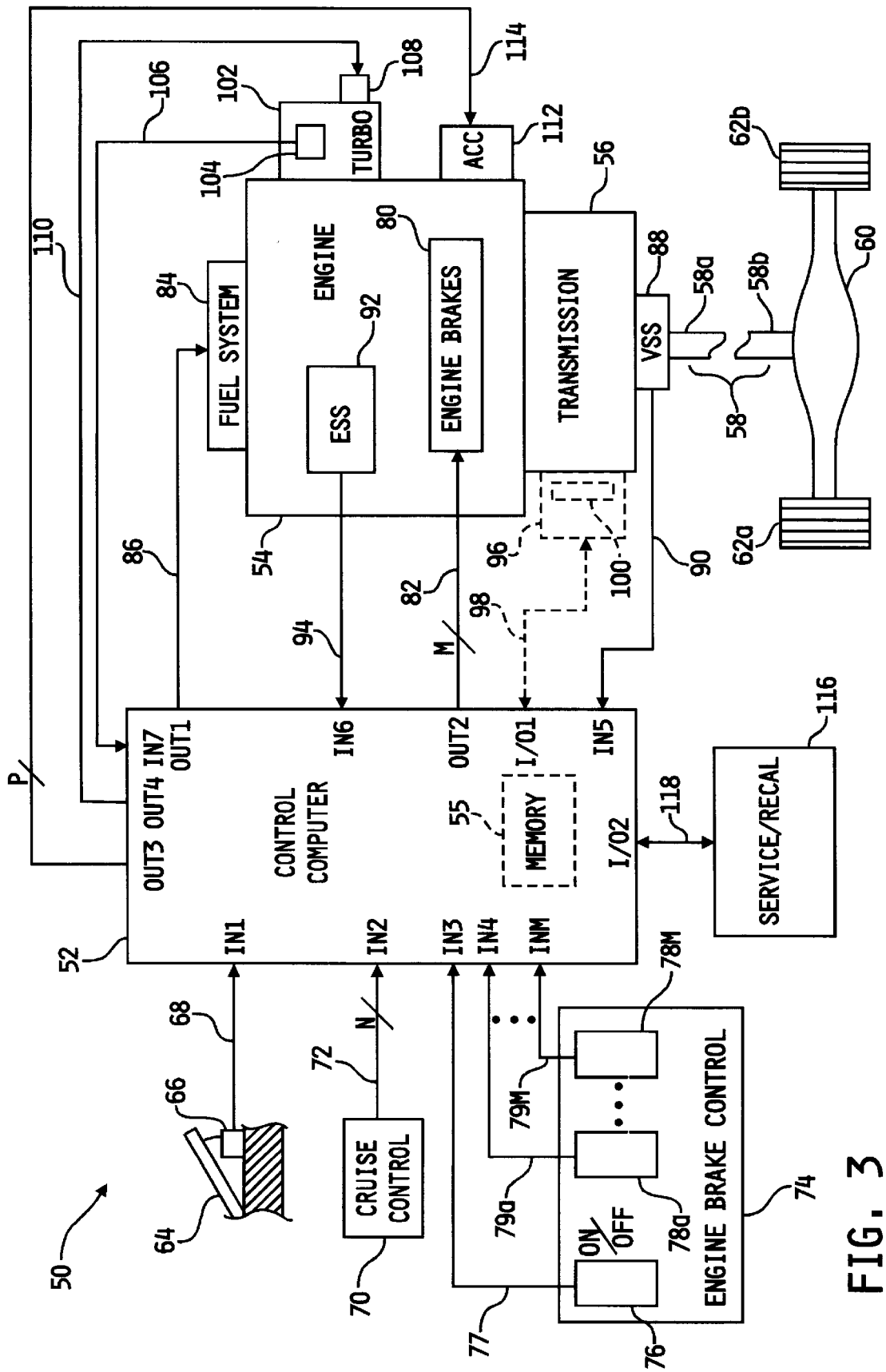
FIG. 3 is a diagrammatic illustration of a system for controlling engine resistance torque, in accordance with the present invention.

Referring now to FIG. 3, one preferred embodiment of a system 50 for controlling engine retarding torque, in accordance with the present invention, is shown. Central to system 50 is a control computer 52 which is preferably microprocessor-based and includes a memory portion 55. In one embodiment, control computer 52 is a so-called engine control module (ECM) or engine control unit (ECU) typically used in controlling and managing the operation of an internal combustion engine 54. Engine 54 is operatively connected to a transmission 56 which is, in turn, operatively connected to a propeller shaft 58. Propeller shaft 58 is shown in FIG. 3 as comprising propeller shafts 58a and 58b, wherein propeller shaft 58b is operatively connected to a drive axle assembly 60 configured to drive vehicle wheels 62a and 62b as is known in the art. The propeller shaft 58 is shown a comprising shafts 58a and 58b to thereby indicate that other known drivetrain components may be disposed therebetween, such as one or more auxiliary transmissions, one or more drive axles, and the like. In any case, drive axle assembly 60 may be identical to axle assembly 10 illustrated in FIGS. 1 and 2, or may be any known drive axle assembly having a pinion gear responsive to positive engine drive torque to drive a corresponding ring gear which, in turn, drives the vehicle wheels 62a and 62b, and wherein the ring gear is operable to drive the pinion gear against the retarding torque of the engine 54 during coast mode (i.e. zero engine fueling) operation.

System 50 includes an accelerator pedal 64 which is mechanically coupled to a pedal position or deflection sensor 66, as is known in the art, wherein the sensor 66 is electrically connected to an input IN1 of control computer 52 via signal path 68. In operation, sensor 66 is responsive to the position or deflection of accelerator pedal 64 to provide a corresponding pedal position signal on signal path 68. It is to be understood that while sensor 66 is illustrated and described as providing a pedal position signal indicative of pedal deflection, the present invention contemplates that sensor 66 may be alternatively operable to provide the pedal position signal in response to pressure applied to pedal 64. In any case, control computer 52 is responsive to the pedal position signal to determine a corresponding commanded throttle percentage.

System 50 further includes a known cruise control unit 70 coupled to an input port IN2 of control computer 52 via a number, N, of signal paths 72 wherein N may be any integer. Typically, cruise control unit 70 includes a cruise ON/OFF switch and a multi-position switch for selecting known SET/COAST and RESUME/ACCEL functions. In this case, signal path 72 typically comprises three signal paths for providing control computer 52 with control signals corresponding to the foregoing three features. In any case, control computer is responsive to the cruise control unit 70, when it is enabled for operation via the ON/OFF function, to determine a corresponding cruise control torque request.

System 50 further includes a known engine compression brake unit 80 that is electrically connected to an output port OUT2 of control computer 52 via a number, M, of signal paths 82. Engine compression brake unit 80 includes an exhaust value actuator for each cylinder of the engine 54 and is responsive to signals provided on signal paths 82 to actuate the various valve actuators to provide engine braking operation as is known in the art. An engine compression brake control unit 74 is provided in the cab area of the vehicle and includes an ON/OFF switch 76 electrically connected to control computer 52 via signal path 77. A number of brake selection switches $78_1$–$78_M$ are provided on the control unit 74 and are connected to inputs IN4–INM of control computer 52 via corresponding signal paths 79a–79M. Typically, three such brake selection switches are included with a six cylinder engine 52 to provide LO, MED and HIGH engine brake operation, wherein three corresponding signal paths $82_1$–$82_3$ are provided at output OUT2 of control computer 52 and are each connected to a pair of exhaust valve actuators. Alternatively, a single three-position brake selection switch may be provided. The present invention further contemplates that a brake selection switch arrangement may be provided to allow for individual and separate activation of each of the exhaust valve actuators, wherein a separate signal path 82 is provided to each valve actuator. It is to be understood, however, that any engine compression brake interface configuration may be used so long as control computer 52 is operable to control the actual activation/deactivation of the various exhaust valve actuators.

Engine 54 includes a fuel system 84 electrically connected to output OUT1 of control computer 52 via at least one signal path 86. Control computer 52 is responsive to either the commanded throttle percentage value (under manual fueling control) or the cruise control requested torque value (under cruise control operation), among other engine/vehicle operating parameters, to produce one or more fueling signals on signal path 86. The fuel system 84 is responsive to the one or more fueling signals to supply fuel to engine 54 as is known in the art.

System 50 further includes a vehicle speed sensor (VSS) 88 connected to input IN5 of control computer 52 via signal path 90. In one embodiment, vehicle speed sensor 88 is disposed about propeller shaft 58a adjacent to the transmission 56 and is operable to sense the rotational speed of the propeller shaft 58a to provide a corresponding vehicle speed signal to control computer 52. Preferably, sensor 88 is a known variable reluctance sensor, although the present invention contemplates utilizing other known sensors operable to sense rotational speed of shaft 58a and produce a vehicle speed signal corresponding thereto. Alternatively, sensor 88 may be positioned at another location suitable for sensing vehicle speed and providing a vehicle speed signal corresponding thereto.

Engine 54 further includes an engine speed sensor (ESS) 92 electrically connected to input IN6 of control computer 52 via signal path 94. Engine speed sensor 92 is operable to sense engine rotational speed and/or position and provide a corresponding engine speed signal to control computer 52. Preferably, sensor 92 is a known Hall effect sensor operable to sense passage thereby of a number of teeth of a gear rotating synchronously with the engine crankshaft (not shown), although the present invention contemplates utilizing other known sensors operable to sense engine rotational speed and provide an engine speed signal corresponding thereto.

In one embodiment, control computer 52 is operable to determine a presently engaged gear ratio of the transmission 56 by computing a ratio of the engine speed signal and the vehicle speed signal as is known in the art. Alternatively, transmission 56 may include means for determining the presently engaged gear ratio and providing a signal corresponding thereto. In this case, transmission 56 may include a module 96 that is electrically connected to an input/output port I/O1 of control computer 52 via signal path 98. Moreover, module 96 may include an auxiliary computer or microprocessor 100 operable to determine, among other operating parameters, the presently engaged gear ratio. In either case, signal path 98 is preferably a serial data link such as an SAE J1587 or SAE J1939 data link.

Engine 54 further includes a turbocharger 102 of known construction and operation. Turbocharger 102 includes therein a boost pressure sensor 104 electrically connected to input IN7 of control computer 52 via signal path 106. Sensor 104 is operable to sense boost air pressure provided by the turbocharger 102 to the intake manifold of the engine 54 (not shown), and provide a corresponding boost pressure signal on signal path 106. Turbocharger 102 further includes a wastegate valve 108 of known construction that is electrically connected to output OUT4 of control computer 52 via signal path 110. In operation, control computer 52 is responsive to the boost pressure signal on signal path 106 to control the wastegate to thereby regulate the amount of exhaust air provided to the input port of the turbocharger, as is known in the art. In one embodiment, the wastegate 108 has four settings (WG0–WG3), wherein each respective setting provides for increased boost air pressure. However, the present invention contemplates that the wastegate 108 may be continuously actuatable to provide for any desired boost pressure.

Engine 54 further includes a number of engine accessories, shown generally at 112, wherein such accessories are electrically connected to an output port OUT4 of control computer 52 via at least one signal path 114. Examples of such engine accessories include, but are not limited to, an engine cooling fan, an air conditioning unit and the like. In general, the engine accessories 112 include systems or devices that consume engine horsepower when in operation, and thereby contribute to the engine resistance torque.

Control computer 52 further includes an input/output port I/O2 which is connectable to a known service/recalibration tool 116 via a signal path 118. Service/recalibration tool 116 is operable, as is known in the art, to provide data to, and extract data from, memory portion 55 of control computer 52, and may accordingly be used to program or reprogram control computer 52 with calibration information and/or executable software code.

In accordance with the present invention, control system 50 is operable to control the retarding torque of engine 54 during coast mode operation, according to any of at least three techniques, to thereby limit the engine retarding torque to a level below the coast mode torque capacities of the various drivetrain components in general, and of the axle assembly 60 in particular. In accordance with a first technique, control computer 52 is operable to deactivate one or more of the engine accessories 112 to thereby reduce engine retarding torque during coast mode operation. For example, the engine cooling fan may impose a load of 30–40 Hp on the engine 52 during fan operation, and control computer 52 is operable in one embodiment to deactivate the engine cooling fan upon detection of high engine retarding torque conditions as will be described more fully hereinafter. Control computer 52 may further, or alternatively, deactivate the vehicle air conditioning unit to similarly reduce engine retarding torque during coast mode operation.

Figure 4:
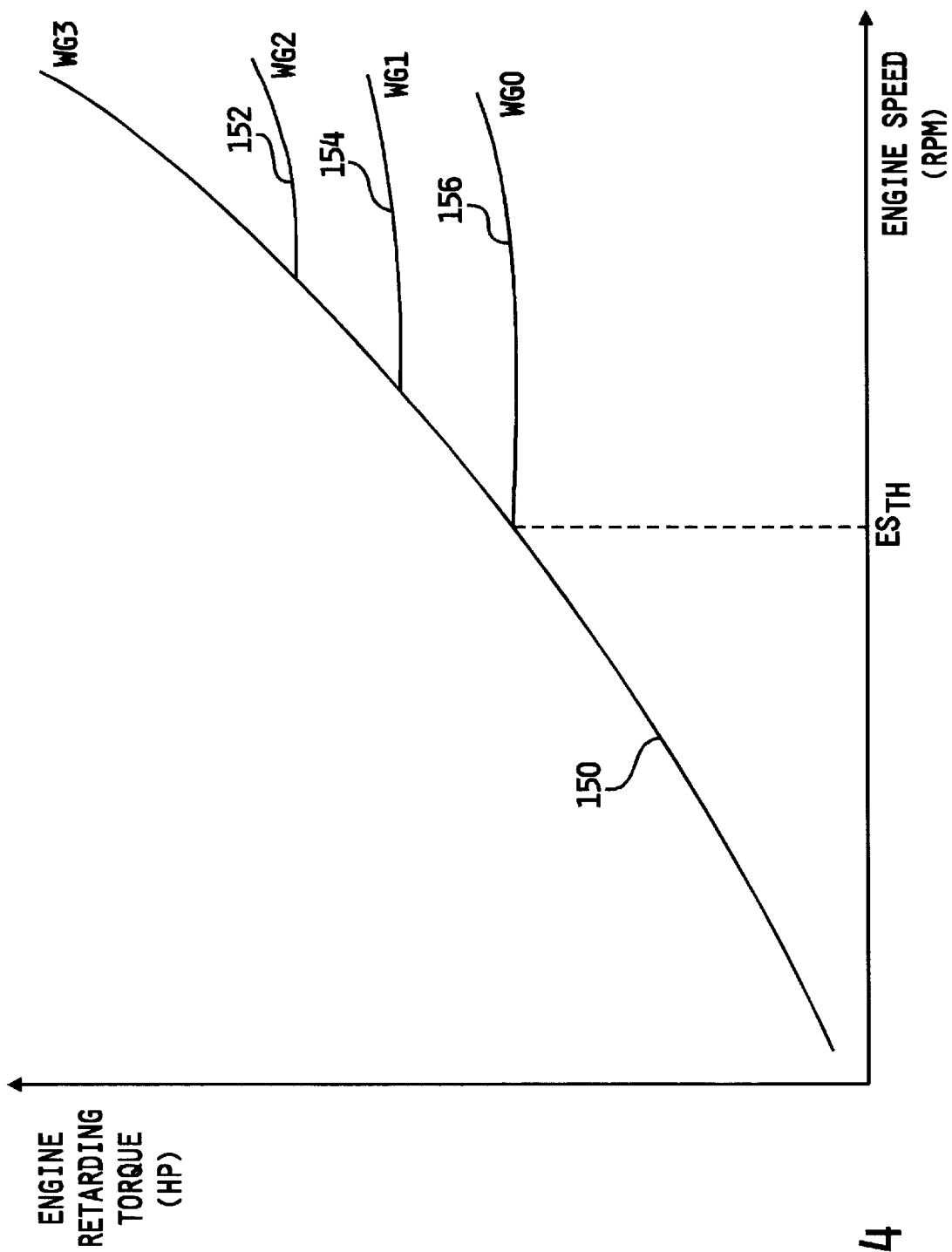
FIG. 4 is a plot of engine retarding capacity vs. engine speed illustrating the effect of various turbocharger wastegate settings on engine operation.

A second technique for controlling engine retarding torque recognizes that engine retarding torque during coast mode operation is proportional to boost pressure as illustrated in FIG. 4. Referring to FIG. 4, a plot of engine retarding capacity (HP) vs. engine speed (RPM) is shown for various settings of the turbocharger wastegate 108. Waveform 150 illustrates that wastegate setting WG3 provides for maximum engine retarding torque at high engine speeds, wastegate setting WG2 provides for lesser retarding torque, wastegate setting WG1 provides for even lesser retarding torque and wastegate setting WG0 provides for the minimum engine retarding torque at high engine speeds. In accordance with this technique, control computer 52 is operable to modulate the setting of the wastegate 108 to thereby reduce engine retarding torque during coast down operation. This technique is particularly advantageous since boost pressure will typically not reach high levels at low engine speeds (i.e. below $ES_{TH}$), and therefore engine retarding operation at low and medium engine speeds will accordingly not be affected by the control techniques of the present invention. At higher engine speeds where engine retarding torque may become excessive, modulation of the maximum boost pressure setting provides an effective means for limiting maximum engine retarding torque.

Figure 5:
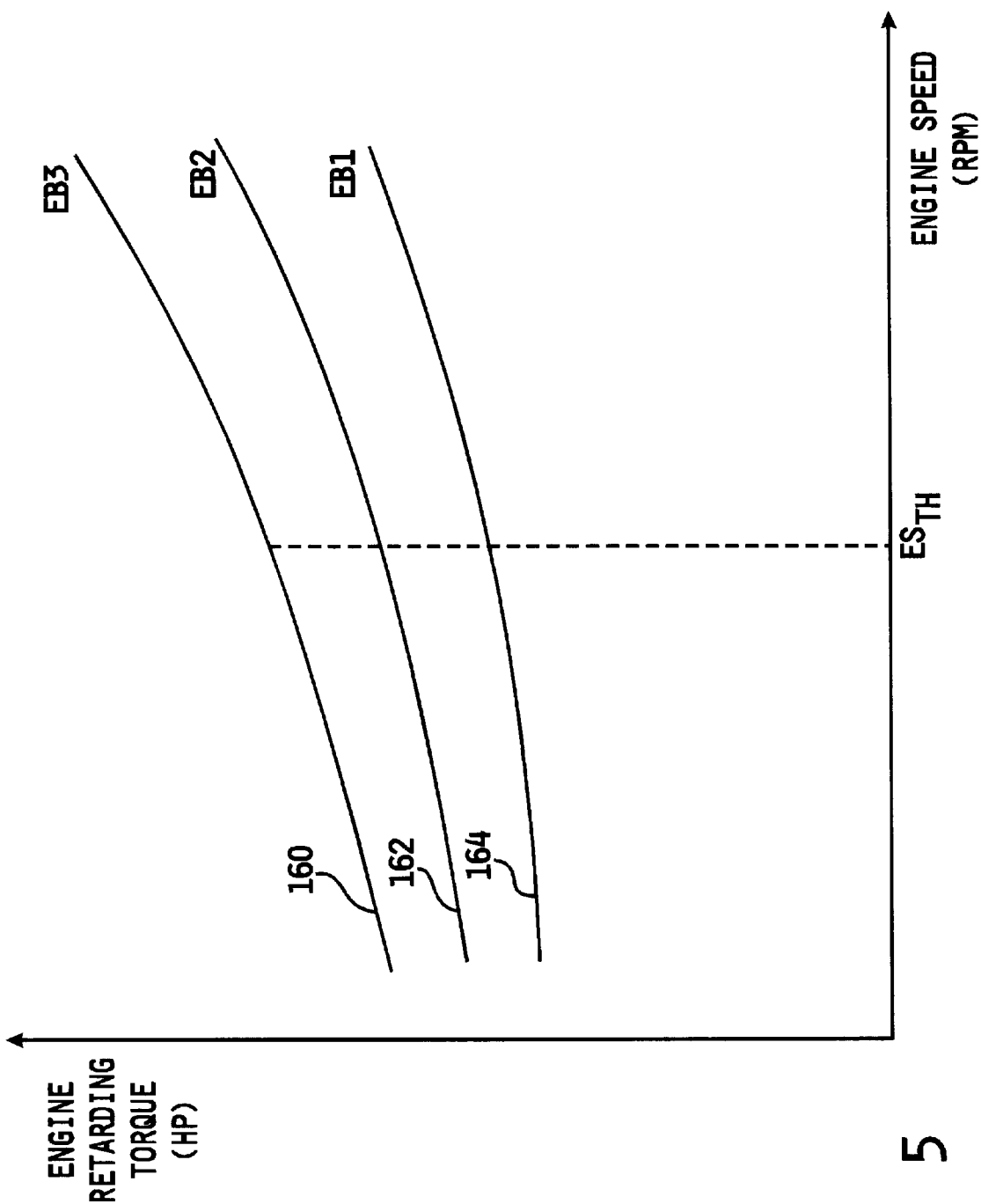
FIG. 5 is a plot of engine retarding capacity vs. engine speed illustrating the effect of various engine compression brake settings on engine operation.

A third technique for controlling engine retarding torque recognizes that engine retarding torque is proportional to the setting of the engine compression brakes 80 as illustrated in FIG. 5. Referring to FIG. 5, a plot of engine retarding capacity (HP) vs. engine speed (RPM) is shown for various engine brake settings, wherein a six cylinder engine is assumed with control over three pairs of exhaust valve actuators. The highest engine brake setting EB3 (all exhaust valve actuators activated so that all cylinders are undergoing compression braking) produces the greatest engine retarding torque during coast mode operation as illustrated by waveform 160. The next lowest engine brake setting EB2 (four of the six exhaust valve actuators activated) produces a lesser engine retarding torque during coast mode operation as illustrated by waveform 162, and the lowest engine brake setting EB1 (two of the six exhaust valve actuators activated) produces and even lesser engine retarding torque during coast mode operation as illustrated by waveform 164. In accordance with this, control computer 52 is operable to reduce engine retarding torque by controlling the number of cylinders subject to engine compression brake operation. One drawback with this technique, however, is that while the engine retarding torque may be reduced at high engine speeds when such torque may become excessive, as desired, reducing the number of cylinders subject to engine brake operation also affects low engine speed engine retarding performance of the engine compression brakes 80 as illustrated in FIG. 5. One way to avoid this condition is to provide for controlled reduction of engine brake operation only when engine speed is above some engine speed threshold $ES_{TH}$ as shown in FIG. 5.

As discussed in the BACKGROUND section, the effective engine retarding torque seen by the drivetrain components downstream from the transmission 56 (between transmission 56 and wheels 62a and 62b) is essentially the engine retarding torque multiplied by the presently engaged gear ratios of the one or more transmissions. Accordingly, it is a primary goal of the present invention to reduce the engine retarding torque during coast down operation according to any one or more of the foregoing techniques, as a function of gear ratio or alternatively as a function of vehicle speed.

Figure 6:
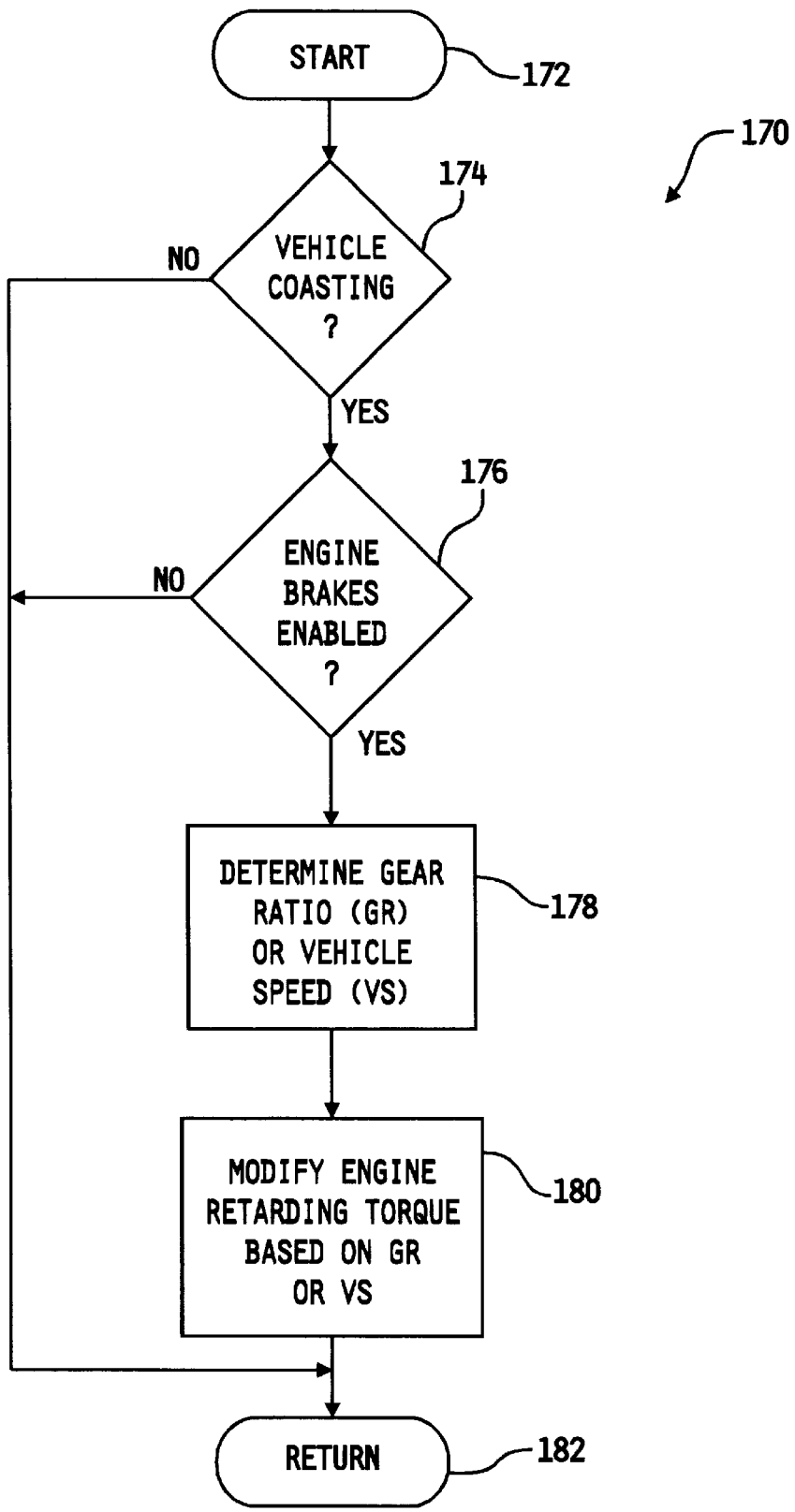
FIG. 6 is a flowchart illustrating one embodiment of a software algorithm for controlling engine resistance torque, in accordance with the present invention.

Referring now to FIG. 6, one embodiment of a software algorithm 170 for controlling engine retarding torque, in accordance with the present invention, is shown. Algorithm 170 is preferably executed by control computer 52, although the present invention contemplates that algorithm 170 may be executed by auxiliary computer 100 (FIG. 3), wherein the appropriate information obtained by algorithm 170 is shared with control computer 52 via the data link 98. For the purposes of describing the operation of algorithm 170, however, it will be assumed that algorithm 170 is executed by control computer 52. Algorithm 170 begins at step 172 and at step 174, control computer 52 determines whether the vehicle is undergoing coast mode operation. Preferably, control computer 52 executes step 174 by monitoring the commanded throttle percentage as well as the commanded fueling signal provided to fuel system 84. If the accelerator pedal 64 is in control of vehicle fueling, either under typical manual control of fueling or manual override of cruise control operation, control computer 52 determines that the vehicle is coasting if the commanded throttle percentage is at or below some percentage (typically zero percent). If, on the other hand, the cruise control unit 70 is in control of fueling, control computer 52 determines that the vehicle is coasting if the commanded fueling signal is less than some fueling level (typically zero fueling). If, at step 174, control computer 52 determines that the vehicle is coasting, algorithm execution continues at step 176. If, on the other hand, control computer 52 determines at step 174 that the vehicle is not coasting (i.e. positive engine fueling, or drive mode operation), algorithm execution continues at step 182 where algorithm 170 is returned to its calling routine.

At step 176, control computer determines whether the engine compression brakes 80 have been enabled for operation, preferably by monitoring the status of switch 76. If, at step 176, control computer 52 determines that the engine compression brakes 80 are enabled, algorithm execution continues at step 178. If, on the other hand, control computer 52 determines at step 176 that the engine compression brakes 80 are not enabled, algorithm execution continues at step 182.

At step 178, control computer 52 is operable to determine the presently engaged gear ratio (GR), or alternatively the vehicle speed (VS), either in accordance with any of the techniques described hereinabove. Thereafter at step 180, control computer 52 is operable to modify the engine retarding torque, in accordance with any of the three techniques described hereinabove. Preferably, memory unit 55 includes a table of engine accessory, wastegate and/or engine compression brake settings as a function of either GR or VS, based on the known coast down torque capacity of axle assembly 60, in order to determine the appropriate setting thereof to reduce or limit the engine retarding torque. Preferably, the values of such a table may be programmed/reprogrammed via the service/recalibration tool 116. The following table I provides one example of wastegate settings for a particular transmission and axle assembly, utilizing the four setting wastegate example illustrated in FIG. 4, as a function of either currently engaged gear ratio (GR) or vehicle speed (VS). Consistent with the discussion hereinabove, it is to be understood that the wastegate settings could alternatively be replaced by engine accessory deactivation or engine compression brake setting instructions.

TABLE I

| Wastegate Setting | GR | VS (mph) |
|---|---|---|
| WG3 | GR < 3:1 | VS > 23 |
| WG2 | 3:1 < GR < 6:1 | 12 < VS < 23 |
| WG1 | 6:1 < GR < 9:1 | 7 < VS < 12 |
| WG0 | GR > 9:1 | VS < 7 |

Algorithm execution continues from step 180 at step 182 where algorithm 170 is returned to its calling routine. Alternatively, steps 174, 176 and 180 may loop back to step 172 for continuous operation of algorithm 170.

Figure 7:
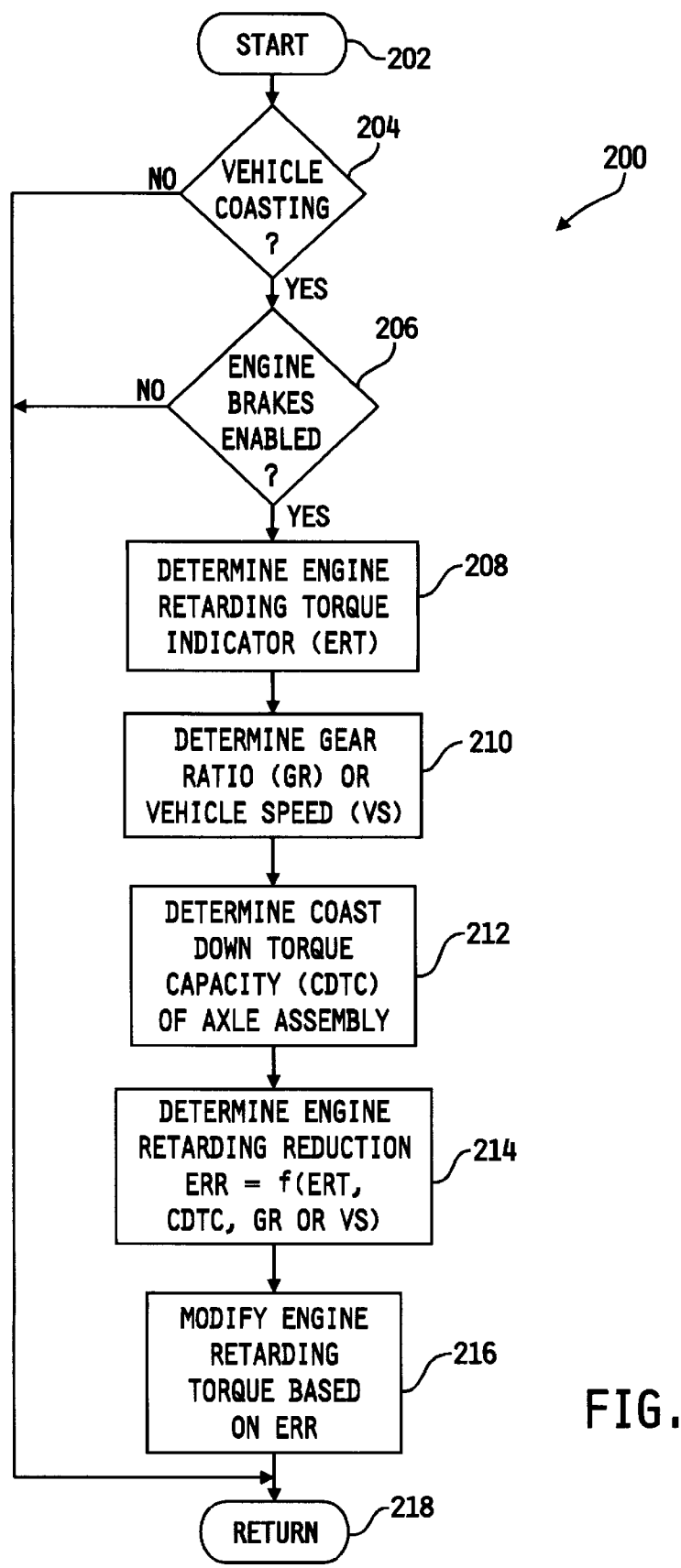
FIG. 7 is a flowchart illustrating another embodiment of a software algorithm for controlling engine resistance torque, in accordance with the present invention.

Referring now to FIG. 7, an alternate embodiment of a software algorithm 200 for controlling engine retarding torque, in accordance with the present invention, is shown. Algorithm 200 is preferably executed by control computer 52 although the present invention contemplates that algorithm 200 may be executed by auxiliary computer 100 (FIG. 3), wherein the appropriate information obtained by algorithm 200 is shared with control computer 52 via the data link 98. For the purposes of describing the operation of algorithm 200 however, it will be assumed that algorithm 200 is executed by control computer 52. Algorithm 200 begins at step 202 and at step 204, control computer 52 is operable to determine whether the vehicle is coasting, preferably as described hereinabove with respect to algorithm 170. If control computer 52 determines at step 204 that the vehicle is coasting, algorithm execution continues at step 206. If, on the other hand, control computer 52 determines at step 204 that the vehicle is not coasting, algorithm execution continues at step 218.

At step 206, control computer 52 is operable to determine whether the engine compression brakes 80 have been enabled, preferably as described hereinabove with respect to algorithm 170. If control computer 52 determines at step 206 that the engine compression brakes 80 have been enabled, algorithm execution continues at step 208. If, on the other hand, control computer 52 determines at step 206 that the engine compression brakes have not been enabled, algorithm execution continues at step 218.

At step 208, control computer 52 is operable to determine an engine retarding torque (ERT) indicator. In one embodiment, the ERT indicator includes boost pressure and engine compression brake setting. Control computer 52 is accordingly operable to determine the present boost pressure via the boost pressure signal provided on signal path 106, and is further operable to monitor signal paths 79a–79M to determine the present setting of the engine compression brakes 80. In an alternative embodiment, control computer 52 is operable to estimate the engine retarding force based on Newton's second law: $F=m_e A$, wherein F is the engine retarding force, $m_e$ is the effective mass of the vehicle and A is the engine or vehicle deceleration. The engine or vehicle deceleration value may be determined by differentiating the corresponding engine or vehicle speed values, although the effective mass $m_e$ value would require information relating to the present road grade conditions. Accordingly, an inclinometer operable to determine road grade in accordance with known techniques, or a GPS system operable to determine road grade conditions based on present vehicle position, would be required. If the effective mass $m_e$ can be determined or estimated within a tolerable error value, the current engine retarding torque can be determined by control computer 52 in real time. In any case, algorithm execution continues from step 208 at step 210.

At step 210, control computer 52 is operable to determine gear ratio (GR) or vehicle speed (VS) in accordance with any of the techniques described hereinabove. Thereafter at step 212, control computer 52 is operable to determine a coast mode torque capacity (CDTC) of the axle assembly 60. Preferably, the CDTC is programmed within memory portion 55 of control computer 52 either at vehicle assembly or thereafter via service/recalibration tool 116. Algorithm execution continues from step 212 at step 214.

At step 214, control computer 52 is operable to determine an engine retarding reduction (ERR) factor based on ERT, CDTC and either GR or VS. If ERT includes current boost pressure and engine compression brake setting, memory portion 55 of control computer 52 preferably includes a table, graph or equation relating the current boost pressure and engine compression brake setting to a corresponding engine retarding torque, wherein such information may be determined via computer simulations or dynamometer testing. Thereafter, and/or if ERT corresponds to an estimated engine retarding torque, control computer is operable to multiply the engine retarding torque value by the presently engaged gear ratio, and compare the resulting effective engine retarding torque value with the coast down torque capacity (CDTC) value stored in memory 55. If the effective engine retarding torque is greater than CDTC, an engine retarding reduction (ERR) factor is determined by control computer 52, wherein the ERR factor corresponds to an amount by which the engine retarding torque must be reduced in order to drop below the CDTC value. If, on the other hand, the effective engine retarding torque is less than the CDTC value, control computer 52 is operable to set the ERR factor to zero. Algorithm execution continues therefrom at step 216.

At step 216, control computer is operable to reduce the engine retarding torque, using any of the three techniques described hereinabove, based on the ERR factor. Thus, if only a slight reduction in engine retarding torque is required, step 216 may comprise deactivating one or more of the engine accessories 112 to thereby effectuate the reduction. Alternatively, step 216 may comprise modulating the setting of the wastegate 108 (which may have either discrete settings or be continuously variable) to thereby effectuate the reduction in engine retarding torque. Alternatively still, or if further reduction is necessary, step 216 may comprise deactivating one or more of the cylinders subjected to engine compression brake operation. In any case, memory 55 of control computer 52 preferably includes one or more tables, similar to that described above, relating the ERR factor to one or more appropriate engine retarding reduction techniques.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected.

What is claimed is:

1. A method of controlling retarding torque of an internal combustion engine equipped with engine compression brakes and carried by a vehicle, the method comprising the steps of:

determining whether the vehicle is undergoing coast mode operation;

determining whether engine compression brake operation is enabled;

determining one of a currently engaged gear ratio and vehicle speed;

determining a coast mode torque capacity of a drive axle carried by the vehicle; and controlling retarding torque of the engine as a function of said one of a currently engaged gear ratio and vehicle speed only if the vehicle is undergoing coast mode operation and engine compression brake operation is enabled, thereby maintaining the retarding torque of the engine below the coast mode torque capacity of the drive axle.

2. The method of claim 1 wherein said step of determining whether the vehicle is undergoing coast mode operation includes:

monitoring a driver commanded throttle percentage; and determining that the vehicle is undergoing coast mode operation if said driver commanded throttle percentage is below a predefined throttle percentage value.

3. The method of claim 2 wherein said step of determining whether the vehicle is undergoing coast mode operation further includes monitoring a cruise control status signal provided by a cruise control unit carried by the vehicle;

monitoring engine fueling; and determining that the vehicle is undergoing coast mode operation if said cruise control status signal indicates that the cruise control unit is enabled and engine fueling is below a predefined engine fueling value.

4. The method of claim 1 said step of controlling retarding torque of the engine includes deactivating at least one engine accessory operable in its activated mode to consume engine horsepower.

5. The method of claim 1 wherein said step of controlling retarding torque of the engine includes modulating boost pressure of a turbocharger associated with the engine to thereby reduce engine retarding capacity.

6. The method of claim 1 wherein said step of controlling retarding torque of the engine includes reducing the number of engine cylinders subject to engine compression brake operation.

7. A system for controlling retarding torque of an internal combustion engine coupled to a transmission, comprising:

an engine compression brake control unit producing a number of engine compression brake request signals and an engine compression brake enabled signal when enabled for operation;

an engine brake system associated with the engine and producing an engine retarding torque in response to at least one engine compression brake control signal;

means for producing a coast mode signal when the vehicle is coasting;

a drivetrain component having a coast mode torque capacity limit associated therewith;

means for determining a currently engaged transmission gear ratio;

means for sensing vehicle speed and producing a vehicle speed signal corresponding thereto; and a control computer responsive to said engine compression brake enabled signal and said coast mode signal to control engine retarding torque as a function of one of said gear ratio and said vehicle speed signal, thereby maintaining the engine retarding torque below said coast down torque capacity limit of said drivetrain component.

8. The system of claim 7 wherein said control computer is responsive to said number of engine compression brake request signals to produce a number of corresponding engine compression brake control signals, said control computer operable to control engine retarding torque by controlling said number of corresponding engine compression brake control signals as a function of said one of currently engaged gear ratio and said vehicle speed signal.

9. The system of claim 7 further including a turbocharger having boost pressure sensor producing a boost pressure signal and a wastegate valve responsive to a wastegate control signal to control turbocharger boost pressure;

and wherein said control computer is responsive to said boost pressure signal to produce said wastegate control signal, said control computer operable to control engine retarding torque by controlling said wastegate control single as a function of said one of currently engaged gear ratio and said vehicle speed signal.

10. The system of claim 7 further including at least one engine accessory operable to consume engine horsepower during operation thereof, said at least one engine accessory responsive to a deactivation signal to discontinue operation thereof;

and wherein said control computer is operable to control engine retarding torque by producing said deactivation signal as a function of said one of currently engaged gear ratio and said vehicle speed signal.

11. The system of claim 7 wherein said control computer is further operable to control and manage operation of said engine.

12. The system of claim 7 wherein said control computer includes an auxiliary computer associated with said transmission, said auxiliary computer determining an engine retarding torque control parameter and communicating said retarding torque control parameter to a second control computer associated with said engine, said second control computer operable to control and manage operation of said engine.

* * * * *

UNITED STATES PATENT AND TRADEMARK OFFICE
CERTIFICATE OF CORRECTION

PATENT NO. : 5,921,883

DATED : July 13, 1999

INVENTOR(S) : Steven M. Bellinger

It is certified that error appears in the above-identified patent and that said Letters Patent is hereby corrected as shown below:

Col. 11, line 12
 replace "single"
 with --signal--

Signed and Sealed this

Fourth Day of January, 2000

Attest:

*Attesting Officer*   *Acting Commissioner of Patents and Trademarks*